May 27, 1930.  P. B. PARKS  1,760,082
THERMOSTAT CONTROL
Original Filed June 18, 1927
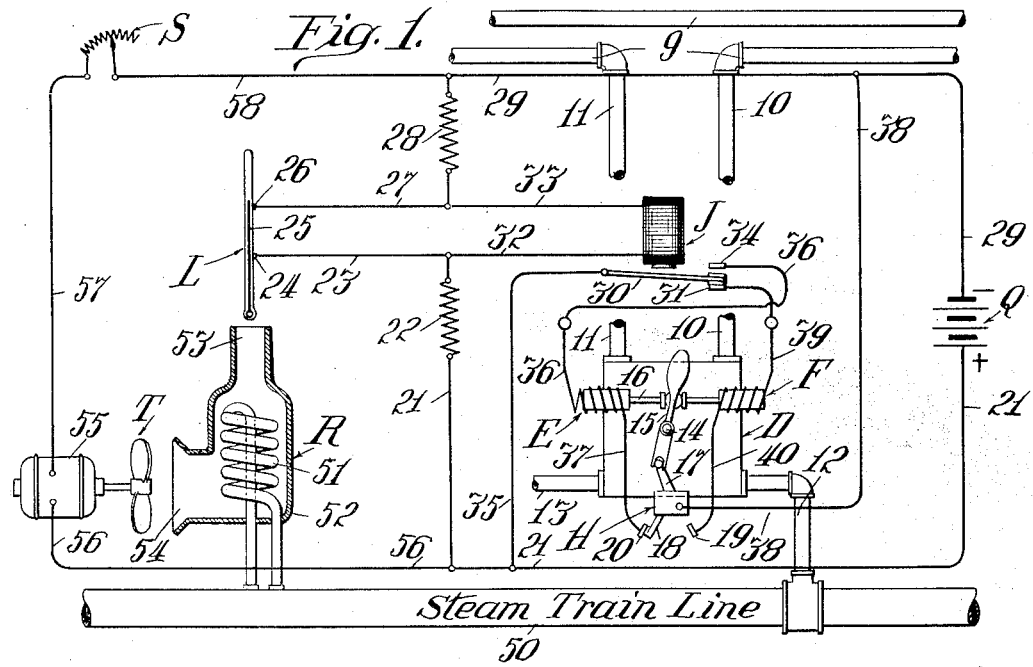
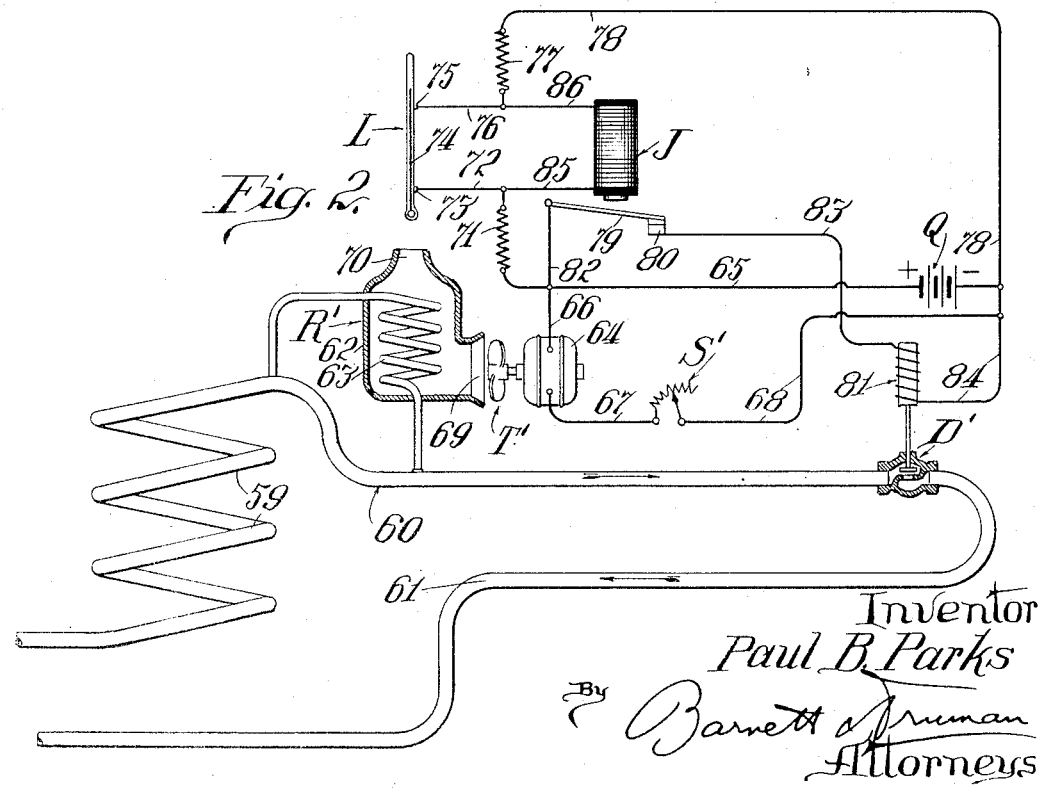
Inventor
Paul B. Parks
By Barnett & Truman
Attorneys Patented May 27, 1930

1,760,082

UNITED STATES PATENT OFFICE

PAUL B. PARKS, OF OAK PARK, ILLINOIS, ASSIGNOR TO VAPOR CAR HEATING COMPANY, INC., OF CHICAGO, ILLINOIS, A CORPORATION OF NEW YORK

THERMOSTAT CONTROL

Original application filed June 18, 1927, Serial No. 199,715. Divided and this application filed August 3, 1928. Serial No. 297,223.

My invention relates to thermostatic mechanism for controlling heating systems, refrigerating systems, or any other apparatus designed to be controlled or its operation started, stopped or varied in response to temperature changes; and the object of the invention is to provide means whereby the functioning of the thermostat may be varied, without actual adjustment of any part thereof, by regulatably varying the temperature of the air or other fluid in the immediate vicinity of the thermostat, for example, the temperature of the atmosphere in proximity to the thermally responsive part of the instrument. The invention may be utilized with a mercury tube electric circuit controlling thermostat, in which connection the invention has particular utility because of the great difficulty in adjusting the thermostat itself for response to different temperatures; or it may be utilized with any other type of thermostat or thermally responsive instrument. Several forms of this invention were first disclosed and broadly claimed in my copending application Serial No. 199,715, filed June 18, 1927, of which this present application is a division.

According to the present invention, a housing is positioned adjacent the thermostat, and a heating or cooling element positioned in this housing adjusts the temperature of the air passing therethrough. A motor-driven fan projects air through this housing against the thermostat, and by adjusting the speed of the fan, the quantity of heated or cooled air projected on the thermostat may be varied so as to obtain the proper temperature adjustment in the thermostat.

The object of the present invention is to provide an apparatus such as briefly described hereinabove, and disclosed more in detail in the description which follows.

Other objects and advantages of the invention will be more apparent from the following detailed description of certain approved forms of the apparatus.

In the accompanying drawings:

Fig. 1 is a diagrammatic view illustrating the application of the invention to a thermostatically controlled steam heating system.

Fig. 2 is a diagram illustrating the application of the invention to a refrigerating system.

Referring first to Fig. 1, 10 and 11 designate the inlet and return pipes of a radiator, indicated diagrammatically at 9, for example, the heating coil of a railway car, and 12 and 13 are the supply and discharge pipes, the pipe 12 leading from the steam train line 50 which is connected with a source of constant steam supply. The pipes 12 and 13 are connected with the casing of a four-way valve D, the valve member of which is fastened to a spindle 14, operated by a lever 15, engaged with the double core structure 16 of a pair of solenoids E and F, E being the valve opening solenoid and F the valve closing solenoid. The relay J switches the current between solenoids E and F, and L is a thermostat, shown as a mercury column type of thermostat, which by making and breaking a circuit, brings about the short circuiting or energization of the relay J. A battery or other source of supply of current is shown at Q. A snap switch H operated by a lever 17 connected with the main operating lever 15 of valve B, breaks the circuit through the solenoid E or F, as the case may be, at the end of the valve movement, this snap switch comprising an oscillating lever 18 operating against contacts 19 and 20.

The operation of the system as thus far described is as follows: With the parts of the apparatus in the positions shown, the heating system is at or above the temperature at which the thermostat L functions to close the circuit which it controls. Valve D is therefore closed. The circuit through the thermostat is as follows:

*Circuit No. 1.*—From battery Q, through wire 21, resistance 22, wire 23, lower contact 24 of the thermostat L, mercury column 25 of the thermostat, upper contact 26 of the thermostat, wire 27, resistance 28 and wire 29 back to the battery.

The resistance of the relay J being greater than the resistance through the thermostat, the relay is effectively short circuited and the pivoted armature 30 has dropped down onto the lower contact 31.

Since the valve D is closed to cut off the supply of heating fluid to the radiator 9, the space heated by this system will gradually cool and when the mercury column 25 of the thermostat by descending moves out of contact with contact 26, the circuit just traced is broken, resulting in the energization over wires 32 and 33 of the relay J, which attracts the armature 30 against upper contact 34. A circuit is now closed through solenoid E, which opens the radiator valve D to admit steam to the radiator, the room temperature being below that which the thermostat L is designed to maintain. This circuit is as follows:

*Circuit No. 2.*—From battery Q through wire 21, wire 35, armature 30, contact 34, wire 36, solenoid E, wire 37, contact 20, snap switch lever 18, wire 38, and wire 29, back to the battery. Solenoid E is now energized so as to move the core member 16 to the left and open valve D. As soon as the valve movement is completed, arm 18 is thrown over against contact 19, thus breaking the circuit through solenoid E.

When the temperature in the room again rises to the point at which the mercury column 25 of thermostat L touches contact 26, a circuit is completed through the closing solenoid F, due to the short circuiting of relay J, the circuit being as follows:

*Circuit No. 3.*—From battery Q through wires 21 and 35, armature 30, contact 31, wire 39, solenoid F, wire 40, contact 19, snap switch arm 18 and wires 38 and 29 to the battery.

The temperature-adjusting mechanism for the thermostat comprises an indirect heater R, consisting of a housing 52 in which is positioned a coil 51, connected at both ends with the main steam supply pipe 50. Housing 52 has an inlet opening 54, and an outlet or chimney 53 directed against the bulb of the thermostat. The fan T is driven by motor 55, the speed of which is controlled by the rheostat S. The motor may be energized by a shunt circuit from circuit No. 1, this circuit being as follows: From battery Q through wire 21, wire 56, motor 55, wire 57, rheostat S, wires 58 and 29 to battery Q. By adjusting the rheostat S to vary the amount of current supplied to the fan motor, the speed of fan T may be varied, thus varying the amount of air projected into housing 52 through inlet opening 54 and thence projected through outlet 53 onto the thermostat L. This air projected through housing 52 is heated by the coil 51. It will be apparent that this heated air affects a substantially constant adjustment in the thermostat L, and the amount of this adjustment may be varied by changing the setting of rheostat S. In this way the thermostat can be influenced, regulatably, so that any desired temperature may be maintained in the apartment being heated. For example, a low temperature may be maintained at night and a higher temperature in the day-time, without any adjustment of the thermostat itself. Less care need be taken in the manufacture of the thermostat, since the rheostat may be set to compensate for any inacuracy in the placing of the upper contact 26 of the thermostat. Also a circulation of air is maintained past the thermostat, which gives it a quicker and more accurate response to temperature changes in the space wherein the temperature is to be controlled.

The application of this invention to a refrigerating system is illustrated in Fig. 2. The supply pipe 60 for the refrigerating medium leads from the condensing coil 59, through cut-off or control valve D' to the refrigerating pipe 61. The auxiliary cooling device R' (which corresponds in general to the auxiliary heating device R, shown in Fig. 1), comprises a housing 62, in which is positioned a cooling coil 63 connected at both ends to the supply pipe 60. The fan T' is driven by the motor 64, the speed of which is controlled by rheostat S'. The motor circuit from battery Q or other source of power is as follows: Wire 65, wire 66, motor 64, wire 67, solenoid S', and wire 68 back to the battery. The fan T' projects air through inlet opening 69 of housing 62, and this air after being cooled by coil 63 is projected through outlet opening or chimney 70 against the thermostat L.

As shown in the drawings, the temperature in the space controlled by this refrigerating apparatus has risen above the desired maximum so that thermostat L has completed a circuit, short circuiting the relay J, this circuit being as follows:

*Circuit No. 4.*—From battery Q through wire 65, resistance 71, wire 72, lower contact 73 of thermostat L, mercury column 74, upper contact 75, wire 76, resistance 77, and wire 78 back to the battery.

Since relay J has been short circuited, the pivoted armature 79 has dropped onto the contact 80, closing a circuit through solenoid 81 of valve D', as follows:

*Circuit No. 5.*—From battery Q, wire 65, wire 82, armature 79, contact 80, wire 83, coil of solenoid 81, and wire 84 back to the battery.

The solenoid 81 being energized will open the valve D' so as to admit refrigerating medium to pipe 61, thus lowering the temperature in the space to be controlled.

When the temperature has been sufficiently lowered in this space, the thermostat L will move down so as to break circuit No. 4 at 75, whereupon the relay J will be energized as follows:

*Circuit No. 6.*—From battery Q, wire 65, resistance 71, wire 85, relay J, wire 86, resistance 77, and wire 78 to the battery.

This will elevate the armature 79 so as to break circuit No. 5 at contact 80, thus deenergizing solenoid 81 and closing the valve D' so as to cut off the flow of cooling fluid to the refrigerating pipe 61.

As in the device shown in Fig. 1, the action of thermostat L is adjusted by projecting a variable quantity of temperature-treated air against this solenoid. In this case the air is cooled by pipe 63 so that a constant cooling correction is applied to the thermostat, and the amount of this correction may be adjusted by setting the rheostat S' which controls the fan motor.

I claim:

1. In a temperature regulating system, a temperature controlling thermostat mounted so as to be exposed to the air in the space, the temperature of which is being regulated, whereby the thermostat will respond to changes in the temperature in this space, and means for adjusting the thermostat comprising a housing mounted adjacent the thermostat, said housing having an inlet opening for receiving air from the space and an outlet opening directed toward the thermostat, means for projecting a regulatable quantity of air through the housing against the thermostat, and means positioned within the housing and over which the air is forced for changing the temperature of this air.

2. In a temperature regulating system, a temperature controlling thermostat mounted so as to be exposed to the air in the space, the temperature of which is being regulated, whereby the thermostat will respond to changes in the temperature in this space, and means for adjusting the thermostat comprising a housing mounted adjacent the thermostat, said housing having an inlet opening for receiving air from the space and an outlet opening directed toward the thermostat, a fan adjacent the inlet opening for projecting air through the housing against the thermostat, means for regulating the fan to vary the quantity of air projected, and means positioned within the housing and over which the air is forced for changing the temperature of this air.

3. In a temperature regulating system, a temperature controlling thermostat mounted so as to be exposed to the air in the space, the temperature of which is being regulated, whereby the thermostat will respond to changes in the temperature in this space, and means for adjusting the thermostat comprising a housing mounted adjacent the thermostat, said housing having an inlet opening for receiving air from the space and an outlet opening directed toward the thermostat, a fan adjacent the inlet opening for projecting air through the housing against the thermostat, means for regulating the fan to vary the quantity of air projected, a pipe coil within the housing and means for circulating a temperature adjusting fluid through the coil.

4. In a temperature regulating system, a source of temperature adjusting fluid, a main temperature adjusting means, a valve for controlling the supply of fluid from the source to the temperature adjusting means, an electrically operated means for controlling the valve, said latter means comprising a circuit making and breaking thermostat, means for varying the operation of the thermostat by projecting against the same a regulatable quantity of air, and means positioned in the path of the air and supplied with fluid from the source for establishing the temperature of this air.

5. In a temperature regulating system, a source of temperature adjusting fluid, a main temperature adjusting means, a valve for controlling the supply of fluid from the source to the temperature adjusting means, an electrically operated means for controlling the valve, said latter means comprising a circuit making and breaking thermostat, a housing mounted adjacent the thermostat, said housing having an inlet opening and an outlet opening directed toward the thermostat, a coil in the housing supplied with fluid from the source, and means for projecting a regulatable quantity of air through the housing against the thermostat.

6. In a temperature regulating system, a source of temperature adjusting fluid, a main temperature adjusting means, a valve for controlling the supply of fluid from the source to the temperature adjusting means, an electrically operated means for controlling the valve, said latter means comprising a circuit making and breaking thermostat, a housing mounted adjacent the thermostat, said housing having an inlet opening and an outlet opening directed toward the thermostat, a coil in the housing supplied with fluid from the source, a fan adjacent the inlet opening for projecting air through the housing against the thermostat, and means for regulating the fan for adjusting the quantity of air projected.

7. In a temperature regulating system, a source of temperature adjusting fluid, a main temperature adjusting means, a valve for controlling the supply of fluid from the source to the temperature adjusting means, an electrically operated means for controlling the valve, said latter means comprising a circuit making and breaking thermostat, a housing mounted adjacent the thermostat, said housing having an inlet opening and an outlet opening directed toward the thermostat, a coil in the housing supplied with fluid from the source, a fan adjacent the inlet opening for projecting air through the housing against the thermostat, a motor for driving the fan, and a rheostat for adjusting the speed of the motor.

8. In a temperature regulating system, a steam supply main, a radiator, a valve for controlling the supply of steam from the main to the radiator, an electrically operated means for opening or closing the valve, said means comprising a circuit making and breaking thermostat, a housing mounted adjacent the thermostat, said housing having an inlet opening and an outlet opening directed toward the thermostat, a radiating coil in the housing constantly supplied with steam from the main, a fan adjacent the inlet opening for projecting air through the housing against the thermostat, and means for regulating the fan to vary the quantity of heated air projected.

PAUL B. PARKS.